(12) United States Patent
Peisker et al.

(10) Patent No.: US 7,037,435 B2
(45) Date of Patent: May 2, 2006

(54) PROCESS FOR BURNING OFF OIL SPILLS

(75) Inventors: August Peisker, Brugg (CH); André Peisker, Platte 158, CH-5237, Mönthal (CH)

(73) Assignee: Andre Peisker, Monthal (CH)

( * ) Notice: Subject to any disclaimer, the term of this patent is extended or adjusted under 35 U.S.C. 154(b) by 119 days.

(21) Appl. No.: 10/470,042

(22) PCT Filed: Jan. 25, 2001

(86) PCT No.: PCT/CH01/00056

§ 371 (c)(1),
(2), (4) Date: Sep. 12, 2003

(87) PCT Pub. No.: WO02/059424

PCT Pub. Date: Aug. 1, 2002

(65) Prior Publication Data

US 2004/0058286 A1 Mar. 25, 2004

(51) Int. Cl.
*E02B 15/04* (2006.01)

(52) U.S. Cl. .......................... 210/747; 210/922; 431/2; 585/14; 44/519

(58) Field of Classification Search ............... 210/747, 210/776, 922, 923, 924, 925; 431/2; 585/14; 44/519
See application file for complete search history.

(56) References Cited

U.S. PATENT DOCUMENTS

| 3,556,698 | A | * | 1/1971 | Tully et al. ................. 431/2 |
| 3,586,469 | A | * | 6/1971 | Molin et al. ................. 431/8 |
| 3,695,810 | A | | 10/1972 | Haegler |
| 3,705,782 | A | * | 12/1972 | Rensvold ................. 431/7 |
| 4,154,684 | A | * | 5/1979 | Tokarz ................. 431/2 |
| 4,786,290 | A | * | 11/1988 | Wyer ................. 44/519 |
| 4,954,077 | A | * | 9/1990 | Tamura ................. 585/14 |
| 5,055,625 | A | * | 10/1991 | Neidiffer et al. ........... 585/14 |
| 5,057,004 | A | * | 10/1991 | McAllister ............... 210/923 |
| 5,093,533 | A | * | 3/1992 | Wilson ................. 585/14 |
| 5,328,353 | A | * | 7/1994 | Keenan ................. 210/922 |
| 6,460,535 | B1 | * | 10/2002 | Nisewander et al. ........ 44/519 |

FOREIGN PATENT DOCUMENTS

| CH | 683521 | 3/1994 |
| DE | 2323139 | 1/1974 |
| GB | 1291649 | 10/1972 |

OTHER PUBLICATIONS

Exon Mobil Varsol Frequently Asked Questions, 2002.*
Translation of Swiss Patent 683521, Mar. 1994.*
Translation of German patent 2332139, Jan. 1974.*

* cited by examiner

*Primary Examiner*—Christopher Upton
(74) *Attorney, Agent, or Firm*—Ladas & Parry LLP

(57) ABSTRACT

Process for burning off oil spills, especially on lakes, seas and marginal seas or in the soil, wherein, prior to ignition, the oil slick is sprayed with an incendiary material containing a readily combustible mixture of saturated and/or unsaturated hydrocarbons, preferably containing a readily combustible mixture of saturated hydrocarbons, and the oil slick soaked with this mixture is then ignited, and incendiary composition and priming compound for carrying out the process.

16 Claims, No Drawings

PROCESS FOR BURNING OFF OIL SPILLS

BACKGROUND OF THE INVENTION

1. Field of the Invention

The present invention relates to a process for burning off oil spills using an incendiary material and preferably a priming compound, and especially for burning off oil spills on lakes, seas or marginal seas or in the soil of coastal areas.

2. Background of the Invention

Oil spills on lakes, seas or marginal seas and in the soil of coastal areas usually cause considerable environmental pollution and damage. Animals and plants immediately suffer substantial damage. The damage to zooplankton and phytoplankton can result in the disappearance of the vital food supply for numerous marine animals in the affected area and can endanger the entire local ecosystem. Disasters due to oil spills are very often caused on the oceans by damaged tankers or incidents on drilling rigs, but they can also be caused by illegal tank flushing. Experience has shown that the consequences of oil disasters cannot be satisfactorily remedied using the conventional technologies.

Transported crude oils sometimes have very different compositions. Different deposits produce crude oils of different composition; also, considerable amounts of heavy crude oils emulsified e.g. with nonylphenol ethoxylate are transported. Individual oil accidents are therefore seldom comparable to one another. Specific types of oil contain more volatile and better combustible or miscible components. The outcome of the disaster is also influenced by the air and water temperatures and by the solar irradiation in the region of the accident. These temperatures influence particularly the evaporation of the readily volatile oil components. The less volatile constituents are left behind as a slick, floating on the water, and over time are dissolved or emulsified in the seawater, are absorbed by plankton or agglomerate into lumps. Parts of the oil slick invade coastal areas and form a sticky mass. If the oil slick sticks to rocky cliffs and reefs, it forms tar-like lumps which take several years to be decomposed by bacteria.

Mechanical suction is used as a simple method of treatment. This method can be applied on the high seas only in the case of compact oil slicks and on the beach only in the case of a freshly washed-up slick. The use of inflated plastic tubes for containment and suction, optionally in combination with skimmers, is problematic even on a slightly choppy sea because it is normally impossible to prevent a troubled sea from splashing over the oil slick. Applications based on the use of surfactants are also of dubious value because of the tricky dosing problems. This is compounded by the fact that emulsifiers very often act as environmental pollutants. After the uptake of small amounts of oil as a result of emulsification, they sink to the bottom of the sea or lake, where they cause damage to the flora and fauna.

The use of oil-decomposing bacteria requires warmer temperatures, an adequate oxygen supply and a long contact time. The essential aspect of oil removal, however, is that it can be achieved quickly so as to minimize the environmental damage.

It has now been found that spills of oil, including heavy and viscous oil, in the form of oil slicks on water surfaces such as lakes or seas, or in the soil, can be ignited and extensively burnt off in a short time if, prior to ignition, the oil slick is sprayed with a readily combustible mixture of saturated and/or unsaturated hydrocarbons, preferably with a mixture of saturated hydrocarbons (also referred to as "incendiary material" hereafter), and the oil slick soaked with this mixture is then ignited. Surprisingly, the oil slick can be completely or almost completely burnt off in this way without exhibiting the above-mentioned disadvantages, even if it contains relatively high proportions of components of low volatility.

SUMMARY OF THE INVENTION

The present invention is defined in the claims. In particular, the present invention relates to a process for burning off oil spills and especially for burning off oil spills on lakes, seas and marginal seas or in the soil, said process being characterized in that, prior to ignition, the oil slick is sprayed with an incendiary material containing a readily combustible mixture of saturated and/or unsaturated hydrocarbons, preferably containing a readily combustible mixture of saturated hydrocarbons, and the oil slick soaked with this mixture is then ignited.

As the readily combustible mixture of saturated and/or unsaturated hydrocarbons, it is preferred to use hydrocarbons having from 4 to 12, preferably from 5 to 10 and particularly preferably 5, 6, 7 or 8 carbon atoms, or a mixture thereof. The boiling point of the mixture ranges preferably from 35° C. to 230° C. and particularly preferably from 40° C. to 200° C. These hydrocarbons can be linear, branched or cyclic.

It is preferred to use a mixture of saturated hydrocarbons of the formula $C_nH_{2n+2}$, in which n is an integer from 5 to 8, preferably 5, 6 or 7 and particularly preferably 5 or 6. The boiling point of the mixture ranges preferably from 35° C. to 110° C. and particularly preferably from 40° C. to 130° C.

In addition to the hydrocarbons, the incendiary material preferably contains at least one additive which improves the rheological properties or the flowability of the oil slick, acts as a solubilizer and/or promotes combustion, or a mixture of such additives, deflagrations simultaneously being avoided by the delaying action of the additive(s).

Examples of additives which improve the rheological properties are $di(C_2-C_{12})$alkyl phthalates, preferably diethyl phthalate, dibutyl phthalate, dioctyl phthalate, di(2-ethylbutyl) phthalate or diamyl phthalate.

Examples of additives which promote combustion are cyclohexanol (hexalin) or toluene.

The incendiary material can contain up to 20% by weight, preferably about 5% by weight to 10% by weight, of additives.

The amount of incendiary material added to a particular oil slick depends on the composition or combustibility of the oil slick. This optimum amount to be added can easily be determined experimentally in each case by those skilled in the art.

Accordingly, the present invention further relates to an agent or an incendiary composition for burning off oil spills and especially for burning off oil spills on lakes, seas or marginal seas or in the soil, said agent being characterized in that it contains a readily combustible mixture of saturated and/or unsaturated hydrocarbons, preferably a readily combustible mixture of saturated hydrocarbons, and additives which improve the rheological properties or the flowability of the oil slick, act as solubilizers and/or promote combustion, as described above and in the following text.

The burn-off of poorly ignitable and poorly combustible oil slicks, for example a bituminous slick, can be further improved by the addition of a gas generator, for example calcium carbide. In contact with water, calcium carbide decomposes to form readily ignitable acetylene gas.

The oil slick sprayed with the incendiary material is preferably ignited by means of a priming compound. The priming compound preferably consists of the above-defined combustible mixture of saturated and/or unsaturated hydrocarbons (incendiary material), said incendiary material being sealed in plastic packaging, preferably in polypropylene bags, in amounts of 0.5 kg to 2.0 kg. Fixed to the packaging is an igniter cord connected to a pull fuse by means of a match cord. The igniter cord can be stuck or tied to the packaging. To prevent water or moisture from entering said combination and damaging it, the entire priming compound is preferably wrapped in or protected by a second bag, for example made of polyethylene. The preferred polypropylene bags are resistant to the hydrocarbons and any additives present and are not attacked by them. Pull fuses, their construction and possible compositions are known per se.

Accordingly, the present invention relates to a priming compound consisting of a combustible mixture of saturated and/or unsaturated hydrocarbons as defined above, said incendiary material being sealed in plastic packaging, preferably in polypropylene bags, in amounts of 0.5 kg to 2.0 kg, and an igniter cord, connected to a pull fuse by means of a match cord, being fixed to said packaging.

This priming compound is very easy to handle. First the pull fuse is operated, after which the appropriately timed match cord begins to burn and transfers the fire to the readily ignitable igniter cord, thereby triggering effective combustion involving the entire priming compound.

DETAILED DESCRIPTION OF THE PREFERRED EMBODIMENTS

Crude oil compositions from different sources are very different, especially as regards the content of naphtha (b.p. 40–200° C.), petroleum (b.p. 200–275° C.), gas oil (b.p. 275–360° C.), heavy oil (b.p. 360–500° C.) and residue. Thus the boiling profile and the composition remaining as the oil slick are also different. Crude oil compositions from different sources, for example ▓Pennsylvania Brandf.▓, ▓California Paloma▓, Texas Sulfur Bluff▓ or ▓Trinidad▓ crude, are known per se.

To successfully burn off an oil slick originating from an oil pest, the procedure according to the invention is first to spray the incendiary material over the oil slick, for example with a pressure pump, or release the incendiary material on to the slick from an aeroplane, and allow the incendiary material to make contact with the oil slick. This contact time depends primarily on the particular outside temperature and water temperature. The priming compound is then thrown on to the oil slick to trigger the burn-off. If the oil layer is coherent, quiet combustion can be expected. The process according to the invention optimizes the ignition behaviour and achieves an even burn-off of the oil slick. Deflagrations or explosive phases are avoided. Expert application of the process eliminates up to 95% of the oil slick by burn-off. The following Examples illustrate the invention.

EXAMPLE 1

(Incendiary Composition)

The following components are combined to form an incendiary mixture which can be used according to the invention.

| Incendiary component: | Parts by weight: |
|---|---|
| White spirit* containing 40% of alkanes | 30.0 |
| Hexane (technical grade) | 15.0 |
| Cyclohexane (technical grade) | 12.0 |
| Pentane (normal pentane) | 10.0 |
| Heptane (technical grade) | 15.0 |
| Decalin (decahydronaphthalene, technical grade) | 10.0 |
| Dimethylformamide | 5.0 |
| Dibutyl phthalate | 3.0 |
| Total end product | 100.0 |

(* the remaining 60% is predominantly made up of naphthenes)

EXAMPLE 2

(Priming Composition)

| Priming component: | Parts by weight: |
|---|---|
| Special boiling point spirit (b.p. 80° C.–110° C.) | 88.0 |
| Highly disperse silicic acid | 6.0 |
| Sodium stearate (finely powdered) | 1.0 |
| Zinc oleate | 5.0 |
| Total end product | 100.0 |

EXAMPLE 3

(Gas Generator Composition)

If a bituminous slick is involved, a gas generator is preferably also used in combination with the priming compound so that the burn-off leaves as little residue as possible.

| Gas generator: | Parts by weight: |
|---|---|
| Calcium carbide (calcium acetylide) (technical grade), in pieces (5–10 mm) | 95.0 |
| Highly disperse silicic acid (Aerosil type) | 5.0 |
| Total end product (in dust form) | 100.0 |

The invention claimed is:

1. Process for burning off oil spills, especially on lakes, seas and marginal seas or in the soil, wherein, prior to ignition, the oil slick is sprayed with an incendiary material containing a readily combustible mixture of saturated and/or unsaturated hydrocarbons, having from 4 to 12 carbon atoms, and at least one additive which improves the rheological properties of the oil slick, acts as a stabilizer, and/or promotes combustion, said additive comprising a di($C_2$–$C_{12}$) alkyl phthalate, and the oil slick soaked with this mixture is then ignited.

2. Process according to claim 1, wherein said saturated and/or unsaturated hydrocarbons, have from 5 to 10 carbon atoms.

3. Process according to claim 1, wherein said saturated and/or unsaturated hydrocarbons, have from 5 to 8 carbon atoms.

4. Process according to claim 1, wherein a mixture of saturated hydrocarbons is used as the incendiary material.

5. Process according to claim 4, wherein said mixture of saturated hydrocarbons has the formula $C_nH_{2n+2}$, in which n is an integer from 5 to 8, is used as the incendiary material.

6. Process according to claim 5, wherein the mixture has a boiling point in the range from 35° C. to 130° C.

7. Process according to claim 1, wherein said additive is selected from the group consisting of diethyl phthalate, dibutyl phthalate, dioctyl phthalate, di(2-ethylbutyl) phthalate, diamyl phthalate and mixtures thereof.

8. Process according to claim 1, wherein the additive contains at least one of cyclohexanol (hexalin) and toluene.

9. Process according to claim 1, wherein the incendiary material contains up to 20% by weight of additives.

10. Process according to claim 1, wherein a gas generator is also added to the oil slick.

11. Process according to claim 10, wherein said gas generator is calcium carbide.

12. Process according to claim 1, wherein the oil slick sprayed with the incendiary material is ignited by means of a priming compound.

13. A process according to claim 1, wherein said incendiary material is ignited by a priming compound comprising:

a combustible mixture of saturated and/or unsaturated hydrocarbons, having from 4 to 12 carbon atoms, sealed in plastic packaging, in amounts of 0.5 to 2.0 kg;

an igniter cord;

a pull fuse; and a match cord;

wherein said igniter cord is connected to said pull fuse by said match cord, fixed to said packaging.

14. Process according to claim 13, wherein said saturated and/or unsaturated hydrocarbons, have from 5 to 10 carbon atoms.

15. Process according to claim 14, wherein said additive is selected from the group consisting of diethyl phthalate, dibutyl phthalate, dioctyl phthalate, di(2-ethylbutyl) phthalate, diamyl phthalate and mixtures thereof.

16. Process according to claim 15, wherein the additive contains at least one of cyclohexanol (hexalin) and toluene.

* * * * *